United States Patent [19]

Parks

[11] Patent Number: 4,848,113
[45] Date of Patent: Jul. 18, 1989

[54] SPARE WHEEL LOCK CONSTRUCTION
[75] Inventor: Jeffery R. Parks, Elma, N.Y.
[73] Assignee: McGard, Inc., Buffalo, N.Y.
[21] Appl. No.: 197,384
[22] Filed: May 23, 1988
[51] Int. Cl.[4] .............................................. E05B 65/12
[52] U.S. Cl. .................................... 70/259; 70/395; 70/465
[58] Field of Search ............... 70/259, 233, 395, 407, 70/409, 465; 414/463, 466; 224/42.06, 42.12, 42.21, 42.23–42.26, 42.29, 42.41

[56] References Cited
U.S. PATENT DOCUMENTS

| | | | |
|---|---|---|---|
| 1,741,314 | 12/1929 | Johnson | 70/259 |
| 1,821,130 | 9/1931 | Wharam | 70/259 |
| 1,942,176 | 1/1934 | Lowe | 224/42.25 X |
| 1,983,767 | 12/1934 | Mueller | 414/463 |
| 2,107,834 | 2/1938 | Phillips | 70/409 X |
| 3,372,821 | 3/1968 | Podhajsky | 414/463 |
| 3,431,756 | 3/1969 | Fennell | 70/259 |
| 3,542,413 | 11/1970 | Hardison | 414/463 X |
| 3,865,264 | 2/1975 | Kuhns | 70/259 X |
| 3,952,894 | 4/1976 | Mendez | 414/463 |
| 4,057,985 | 11/1977 | Stahl | 70/259 X |
| 4,059,197 | 11/1977 | Iida | 70/259 X |
| 4,174,797 | 11/1979 | Yasue et al. | 414/463 X |
| 4,228,873 | 10/1980 | Nyborg, Jr. | 70/465 X |
| 4,249,682 | 2/1981 | Yasue et al. | 224/42.23 |
| 4,492,506 | 1/1985 | Hoagland et al. | 414/463 |
| 4,526,021 | 7/1985 | Princell | 70/259 X |
| 4,544,136 | 10/1985 | Denman et al. | 414/463 X |
| 4,574,602 | 3/1986 | Furuse | 70/259 X |
| 4,613,273 | 9/1986 | Wagner | 414/463 |
| 4,625,947 | 12/1986 | Denman et al. | 414/463 X |
| 4,674,306 | 6/1987 | Halpern | 70/233 |

FOREIGN PATENT DOCUMENTS

| | | | |
|---|---|---|---|
| 902011 | 6/1972 | Canada | 70/259 |
| 1014447 | 8/1957 | Fed. Rep. of Germany | 414/466 |
| 0234077 | 11/1985 | Japan | 224/42.23 |
| 1274286 | 5/1972 | United Kingdom | 70/259 |

Primary Examiner—Robert L. Wolfe
Assistant Examiner—Suzanne L. Dino
Attorney, Agent, or Firm—Joseph P. Gastel

[57] ABSTRACT

A lock arrangement for a vehicle spare wheel hoist and storage construction including a lock member mounted on the input shaft of a winch and having a curvilinear groove therein, an elongated plastic tube having one end mounted on the lock member by a spring clip and the other end extending through an aperture in the frame of the vehicle, and an elongated shaft having a key mounted therein for insertion through the elongated plastic tube and into mating engagement with the curvilinear groove for turning the input shaft of the winch.

15 Claims, 2 Drawing Sheets

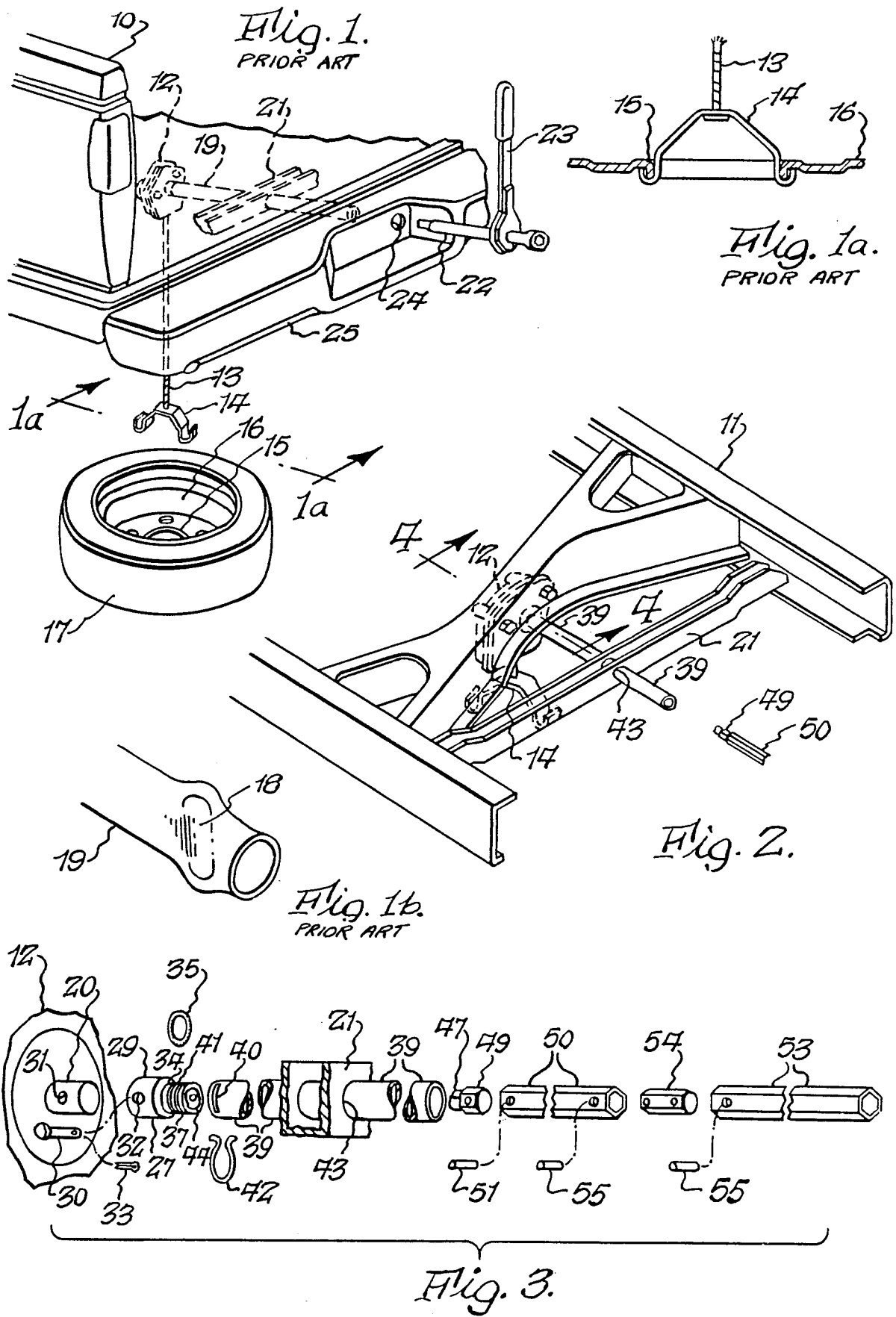

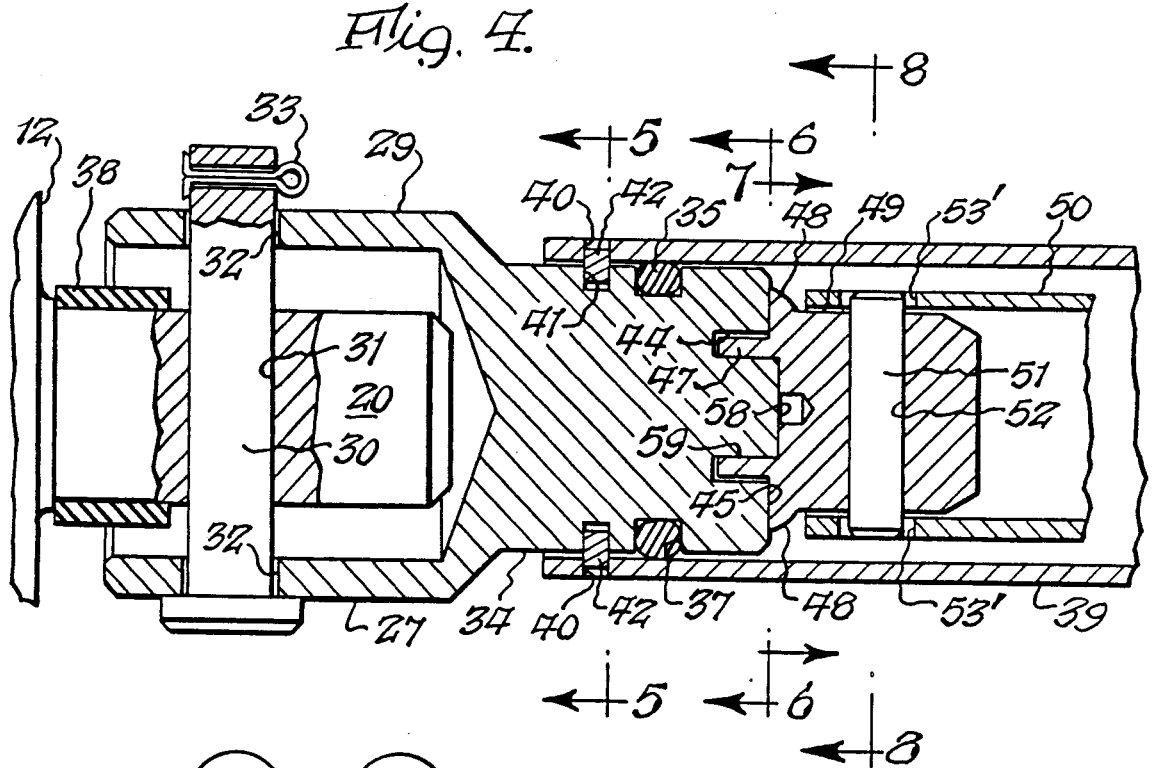
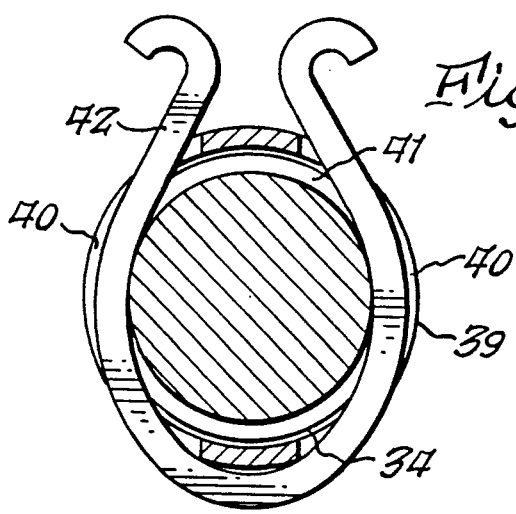
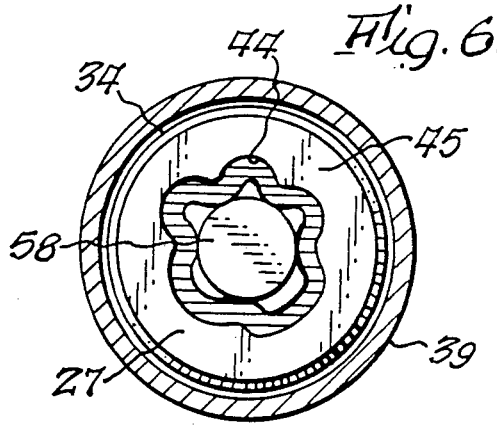
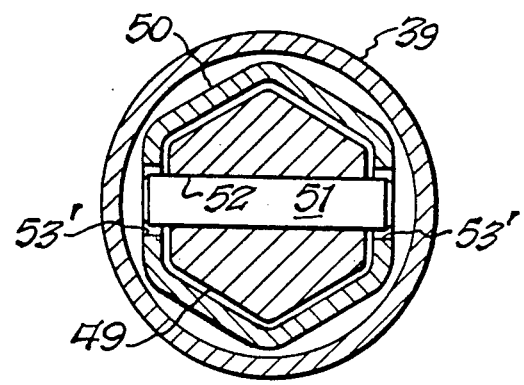

SPARE WHEEL LOCK CONSTRUCTION

BACKGROUND OF THE INVENTION

The present invention relates to a spare wheel lock construction for an automotive vehicle.

By way of background, at the present time certain vehicles have a winch arrangement mounted on their frame for lifting a spare wheel up into a storage place underneath the vehicle. An elongated shaft member is connected to the input shaft of the winch. The winch is actuated by inserting a lug wrench through a hole in the bumper and turning the elongated shaft member. It is in this manner that the cable of the winch can be raised and lowered to store and remove the wheel mounted thereon. However, since the winch is actuatable by a lug wrench, the wheel is susceptible to unauthorized removal by anyone having a lug wrench or similar tool. In addition, the elongated shaft member can be turned from underneath the vehicle by applying a conventional wrench thereto to lower the spare wheel. It is with overcoming the foregoing deficiency that the present invention is concerned.

SUMMARY OF THE INVENTION

It is accordingly the object of the present invention to provide a lock arrangement which can be incorporated into an existing winch structure on an automotive vehicle for preventing unauthorized operation of the winch, and thus preventing unauthorized removal of the spare wheel. Other objects and attendant advantages of the present invention will readily be perceived hereafter.

The present invention relates to a lock arrangement for a spare wheel hoist of an automotive vehicle having a winch mounted on the frame of an automotive vehicle and an input shaft on said winch, the lock arrangement comprising a lock member having a curvilinear groove therein, mounting means for fixedly mounting said lock member on said input shaft, an elongated tubular member having first and second ends, first means mounting said first end on said lock member, second means mounting said second end on said frame, a key having a curvilinear ridge of complementary mating shape to said curvilinear groove, an elongated shaft, and means mounting said key on said elongated shaft to thereby permit said key to be inserted into said tubular member for driving engagement with said lock member.

The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view of the rear end of an automotive vehicle having a prior art winch construction for raising a vehicle wheel into stored position underneath the vehicle;

FIG. 1a is a fragmentary cross sectional view taken substantially along line 1a—1a of FIG. 1;

FIG. 1b is a fragmentary perspective view of the end of the prior art shaft which receives a lug wrench for actuating the winch;

FIG. 2 is a fragmentary perspective view of the lock arrangement of present invention mounted in association with the existing winch structure on the frame of the vehicle;

FIG. 3 is a fragmentary exploded view of the various components of applicant's lock arrangement shown in relationship to the winch and frame of the vehicle;

FIG. 4 is a fragmentary enlarged cross sectional view taken substantially along line 4—4 of FIG. 2;

FIG. 5 is a cross sectional view taken substantially along line 5—5 of FIG. 4 and showing the spring clip which mounts the tubular member on the lock member;

FIG. 6 is a cross sectional view taken substantially along line 6—6 of FIG. 5 and showing the curvilinear groove in the lock member FIG. 7 is a cross sectional view taken substantially along line 7—7 of FIG. 6 and showing the curvilinear ridge on the key; and FIG. 8 is a cross sectional view taken substantially along line 8—8 of FIG. 4 and rotated 90° and showing the connection between the key and the elongated shaft on which it is mounted.

DESCRIPTION OF THE PREFERRED EMBODIMENTS

The vehicle 10 of FIG. 1 has a frame 11 (FIG. 2) with a winch 12 mounted thereon. A cable 13 is associated with the winch, and it mounts a bracket 14 at its outer end which is adapted to be attached to the inner peripheral portion 15 of the wheel rim 16 which mounts tire 17. An elongated shaft 19 in the form of a tube is pinned to input shaft 20 (FIG. 3) of winch 12. The outer end of shaft 19 is rotatably supported in a hole 43 in vehicle frame member 21. The end of tubular shaft 19 remote from winch 12 is pinched at 18 for selectively receiving the sharp end of elongated wheel nut wrench 22 in mating relationship with a wedge fit. A handle 23 is applied to wheel nut wrench 22 to turn shaft 19 to raise and lower cable 13 for raising and lowering rim 16. The wheel nut wrench 22 is selectively passed through a hole 24 in bumper 25 and into wedged engagement with the pinched end of tubular shaft 19 to effect the foregoing turning of shaft 19. When the winch 12 is not being actuated, wheel nut wrench 22 and wrench handle 23 are stored in a remote area, such as the tool box of a truck.

In the past, wheel rims, such as 16, with tires 17 mounted thereon could be unauthorizedly removed from a stored position by anyone having a wheel nut wrench, such as 22, or a similar device which could be inserted through aperture 24 to turn tubular shaft 19. Also, tubular shaft 19 is accessible from underneath the vehicle and can be turned by applying a conventional wrench thereto.

In accordance with the present invention, an arrangement is provided for preventing unauthorized removal of wheel rim 16 and tire 17 by replacing certain of the elements from FIG. 1 with a lock arrangement. More specifically, the tubular shaft 19 is removed from its position of FIG. 1. This can be done because it is coupled to the input shaft 20 of the winch by a pin (not shown) which can be removed. The reduced end portion 34 of lock member 27 is thereafter inserted into elongated plastic tube 39 which has an end with two spaced circumferential slots 40 therein after an O-ring 35 is installed in annular groove 37. O-ring 35 provides a seal between reduced end portion 34 and tubular member 39 to prevent debris and other foreign matter from passing into tube 39 beyond O-ring 35. The lock member has an annular groove 41 therein which is in alignment with slots 40 of tube 39. A spring clip 42 is inserted in the aligned grooves 40 and 41 to maintain tube 39 fixedly mounted against axial movement on the reduced end portion 34 of lock member 27.

The subassembly of lock 27 and tube 39 are then mounted on winch input shaft 20. In this resect, the end of tube 39 remote from lock 27 is inserted from left to right through frame hole 43 in FIG. 2. Thereafter, the subassembly is moved from right to left in FIG. 2 to telescopically install cylindrical end 29 of lock 27 onto input shaft 20. The lock 20 is then locked in position with a pin 30 which passes through bore 31 in shaft 20 and aligned bores 32 in lock member 27. The internal diameter of cylindrical end 29 is larger than the diameter of winch shaft 20 to thereby provide a loose connection therewith to compensate for any misalignment between the axes of shaft 20 and frame hole 43. In this respect, lock portion 29 can move radially relative to shaft 20. Tilting of lock member 27 relative to shaft 20 is also possible because holes 32 are oversize relative to pin 30. Pin 30 is held in position by a cotter key 33. A rubber sleeve is installed, as shown, to prevent metal-to-metal contact which could result in rattling noises. Sleeve 38 is part of the prior construction of FIG. 1. Normally tubular member 39, which is rotatably mounted in frame hole 43, will rotate with lock member 27 when the latter is turned by the key described hereafter. However, there can be slippage therebetween because the spring clip and O-ring can permit this. This slippage prevents the lock member 27 from being turned by rotating the tube 39 itself.

A curvilinear groove 44 is located in the face 45 of lock member 27. Groove 44 is irregular and is of the same configuration as curvilinear ridge 47 of key 49 which is mounted at the end of hollow hexagonal shaft 50 by means of a pin 51 which extends through bore 52 in key 49 and aligned bores 53' in shaft 50. Pin 51 has a press fit with bore 52 and a loose fit with holes 53' to permit a slight swiveling action of key 49 on shaft 50 to compensate for slight misalignments of various parts of the system, namely, the axes of lock 27, tube 39 and bumper hole 24. Flash protuberances 48 are formed on key 49 and limit the amount which key 49 can be inserted into tube 50 during assembly. Flash 48 is formed during the coining operation in which the key is formed. For the sake of convenience, the entire elongated shaft is made up of a plurality of sections, namely, section 50 and a like section 53 which are connected by plug 54 and pins 55. Each section 16 is approximately 16 inches long.

As can be seen from FIGS. 7 and 8, the outer diameter of elongated shaft 50 is smaller than the internal diameter of tubular member 39 so that there will not be any binding between shaft 50 and tubular member 30 if hole 24 in the bumper 25 is not in exact alignment with the axis of tube 39.

In order to seat curvilinear ridge 47 into curvilinear groove 44, after shaft 50 has been inserted into tube 39 after passing through bumper hole 24, all that is necessary is to rotate shaft 50 and press it axially toward the lock member 27 until ridge 47 falls into groove 44. To establish the alignment of the ridge 47 with groove 44, a cylindrical protuberance 58 is formed on lock 27., and it is received within the innermost portions 59 of ridge 47 which lie on a circle which is only of slightly larger diameter than that of protuberance 58. Thereafter, a handle, which may be a wrench, is applied to elongated shaft portion 53 to actuate the winch.

It can thus be seen that the winch 12 cannot be actuated by inserting any type of elongated rod 22 through the bumper as with the prior art of FIG. 1, but that a specialized key, such as 49, is required to matingly engage lock member 27. Furthermore, if an attempt is made to turn tube 39 with a wrench from underneath the vehicle, this will not result in turning lock 27 because of the above-described slip connection therebetween. Thus, unauthorized removal of the wheel rim 16 and the tire mounted thereon may be effectively prevented.

While the lock member 27 has been shown with a curvilinear two-sided groove 44, it will be appreciated that the groove may be of any other configuration.

It can thus be seen that the improved locking arrangement of the present invention is manifestly capable of achieving the above-enumerated objects, and while preferred embodiments of the present invention have been disclosed, it will be appreciated that it is not limited thereto but may be otherwise embodied within the scope of the following claims.

What is claimed is:

1. In a spare wheel hoist and storage construction having a winch mounted on the frame of an automotive vehicle and an input shaft on said winch, a lock arrangement comprising a lock member having key-receiving means therein, mounting means for fixedly mounting said lock member on said input shaft, an elongated tubular member having first and second ends, first means mounting said first end on said lock member, second means mounting said second end on said frame, a key having means for mating relationship with said key-receiving means, an elongated shaft of a size for fitting within and passing through said elongated tubular member, means mounting said key on said elongated sheet to thereby permit said elongated shaft with said key mounted thereon to be inserted into said tubular member proximate said second end for passage therethrough and into driving engagement with said lock member proximate said first end, said first means comprising a circumferential slot on said lock member, circumferential slot means on said first end in alignment with said circumferential slot, and spring clip means extending through said aligned circumferential slot and circumferential slot means.

2. In a spare wheel hoist and storage construction as set forth in claim 1 wherein said first end shields said curvilinear groove.

3. In a spare wheel hoist and storage construction as set forth in claim 1 wherein said elongated tubular member is fabricated of plastic.

4. In a spare wheel hoist and storage construction as set forth in claim 3 wherein said second means comprises an aperture in said frame.

5. In a spare wheel hoist and storage construction having a winch mounted on the frame of an automotive vehicle and an input shaft on said winch, a lock arrangement comprising a lock member having key-receiving means therein, mounting means for fixedly mounting said lock member on said input shaft, an elongated tubular member having first and second ends, first means mounting said first end on said lock member, second means mounting said second end on said frame, a key having means for mating relationship with said key-receiving means, an elongated shaft of a size for fitting within and passing through said elongated tubular member, means mounting said key on said elongated shaft o thereby permit said elongated shaft with said key mounted thereon to be inserted into said tubular member proximate said second end for passage therethrough and into driving engagement with said lock member proximate said first end, and seal means located between said first end and said lock member.

6. In a spare wheel hoist and storage construction as set forth in claim 5 wherein said seal means comprises an O-ring axially positioned between said curvilinear groove and said first means.

7. In a spare wheel hoist and storage construction having a winch mounted on the frame of an automotive vehicle and an input shaft on said winch, a lock arrangement comprising a lock member having a key-receiving means therein, mounting means for fixedly mounting said lock member on said input shaft, an elongated tubular member having first and second ends, first means mounting said first end on said lock member, second means mounting said second end on said frame, a key having means for mating relationship with said key-receiving means, an elongated shaft of a size for fitting within and passing through said elongated tubular member, and means mounting said key on said elongated shaft to thereby permit said elongated shaft with said key mounted thereon to be inserted into said tubular member proximate said second end for passage therethrough and into driving engagement with said lock member proximate said first end, said first means comprising a connection which permits said elongated tubular member to rotate relative to said lock member.

8. In a spare wheel hoist and storage construction having a winch mounted on the frame of an automotive vehicle and an input shaft on said winch, a lock arrangement comprising a lock member having key-receiving means therein, mounting means for fixedly mounting said lock member on said input shaft, an elongated tubular member having first and second ends, first means mounted said first end on said lock member, second means mounting said second end on said frame, said first means comprising a circumferential slot on said lock member, circumferential slot means on said first end in alignment with said circumferential slot, and spring clip means extending through said aligned circumferential slot and circumferential slot means.

9. In a spare wheel hoist and storage construction as set forth in claim 8 wherein said first end shields said curvilinear groove.

10. In a spare wheel hoist and storage construction as set forth in claim 8 wherein said elongated tubular member is fabricated of plastic.

11. In a spare wheel hoist and storage construction as set forth in claim 10 wherein said second means comprises an aperture in said frame.

12. In a spare wheel hoist and storage construction having a winch mounted on the frame of an automotive vehicle and an input shaft on said winch, a lock arrangement comprising a lock member having key-receiving means therein, mounting means for fixedly mounting said lock member on said input shaft, an elongated tubular member having first and second ends, first means mounting said first end on said lock member, second means mounting said second end on said frame, and seal means located between said first end and said lock member.

13. In a spare wheel hoist and storage construction as set forth in claim 12 wherein said seal means comprises an O-ring axially positioned between said curvilinear groove and said first means.

14. In a spare wheel hoist and storage construction having a winch mounted on the frame of an automotive vehicle and an input shaft on said winch, a lock arrangement comprising a lock member having key-receiving means therein, mounting means for fixedly mounting said lock member on said input shaft, an elongated tubular member having first and second ends, first means mounting said first end on said lock member, and second means mounting said second end on said frame, said first means comprising a connection which permits said elongated tubular member to rotate relative to said lock member.

15. In a spare wheel hoist and storage construction having a winch mounted on the frame of an automotive vehicle and an input shaft on said winch, a lock arrangement comprising a lock member having key-receiving means therein, mounting means for fixedly mounting said lock member on said input shaft, an elongated tubular member having first and second ends, first means mounting said first end on said lock member, second means mounting said second end on said frame, a key having means for mating relationship with said key-receiving means, an elongated shaft having said key means thereon and being of a size for insertion inserted into said second end of said tubular member for passage therethrough for placing said key means into driving engagement with said lock member proximate said first end of said tubular member.

* * * * *

UNITED STATES PATENT AND TRADEMARK OFFICE
CERTIFICATE OF CORRECTION

PATENT NO. : 4,848,113
DATED : July 18, 1989
INVENTOR(S) : Jeffery R. Parks

It is certified that error appears in the above-identified patent and that said Letters Patent is hereby corrected as shown below:

Column 1, line 66, after "of" insert --the--.
Column 3, line 61, after "27" delete the period.
Column 4, line 33 (claim 1), change "sheet" to --shaft--.
Column 4, line 65 (claim 5), change "o" to --to--.
Column 5, line 11 (claim 7), after "having" delete "a".
Column 5, line 35 (claim 8), change "mounted" to --mounting--.

Signed and Sealed this

Twelfth Day of June, 1990

Attest:

HARRY F. MANBECK, JR.

*Attesting Officer*  *Commissioner of Patents and Trademarks*